(12) United States Patent
Shiloach et al.

(10) Patent No.: US 7,483,630 B1
(45) Date of Patent: Jan. 27, 2009

(54) EXCHANGING ASYNCHRONOUS SYSTEM INFORMATION USING OPTICAL TRANSMISSION

(75) Inventors: Doron Shiloach, New York, NY (US); Michael M Tsao, Yorktown Heights, NY (US); Daniel Kuchta, Patterson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/044,960

(22) Filed: Mar. 8, 2008

(51) Int. Cl.
*H04B 10/24* (2006.01)

(52) U.S. Cl. .......................... 398/41; 398/115; 398/183

(58) Field of Classification Search ................... 398/41, 398/115–117, 183
See application file for complete search history.

(56) References Cited

U.S. PATENT DOCUMENTS

| | | | |
|---|---|---|---|
| 5,079,770 A | 1/1992 | Scott | |
| 5,740,199 A | 4/1998 | Sibigtroth | |
| 5,864,486 A | 1/1999 | Deming et al. | |
| 6,078,974 A | 6/2000 | Kirshtein | |
| 6,880,012 B1 | 4/2005 | Grimes et al. | |
| 6,963,972 B1 * | 11/2005 | Chang et al. | ................. 713/153 |
| 7,162,164 B2 | 1/2007 | Brown et al. | |
| 7,266,306 B1 | 9/2007 | Harley et al. | |
| 2004/0153507 A1 | 8/2004 | Zeitler et al. | |
| 2005/0022075 A1 | 1/2005 | Rodriquez | |
| 2006/0075170 A1 * | 4/2006 | Behrendt et al. | ............. 710/110 |
| 2007/0234080 A1 | 10/2007 | Mackey et al. | |

FOREIGN PATENT DOCUMENTS

JP         62-199135 A      9/1987

\* cited by examiner

*Primary Examiner*—Leslie Pascal
(74) *Attorney, Agent, or Firm*—The Law Firm of Andrea Hence Evans, LLC; Andrea H. Evans, Esq.

(57) ABSTRACT

A method for sending and receiving asynchronous signals using optical techniques. The present invention implements open-drain circuit signaling utilizing a Finite State Machine and additional logic to reduce power requirements when transmitting asynchronous information via an optical transmission line. An embodiment exploits the 8 bit/10 bit encoder to detect errors and signal the beginning of valid data along the transmission line. The asynchronous signals may be transmitted during transitions in the Finite State Machine.

1 Claim, 5 Drawing Sheets

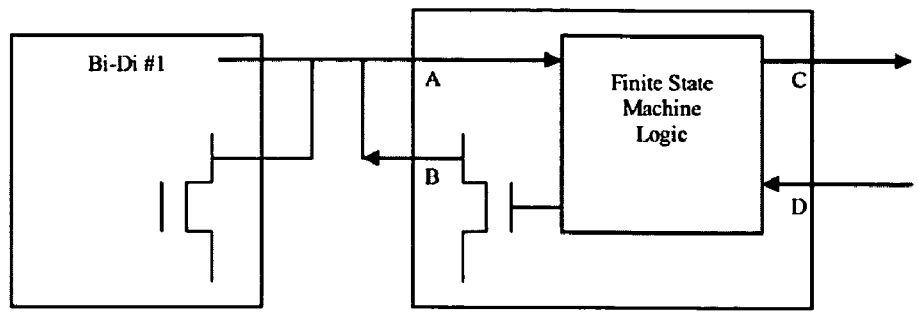
Figure 3
| Inputs | | Outputs | |
|---|---|---|---|
| A | D | B | C |
| 1 | 1 | 1 | 1 |
| 0 | 1 | 1 | 0 |
| 1 | 0 | 0 | 1 |
| 0 | 0 | 1 | 1 |
Figure 4
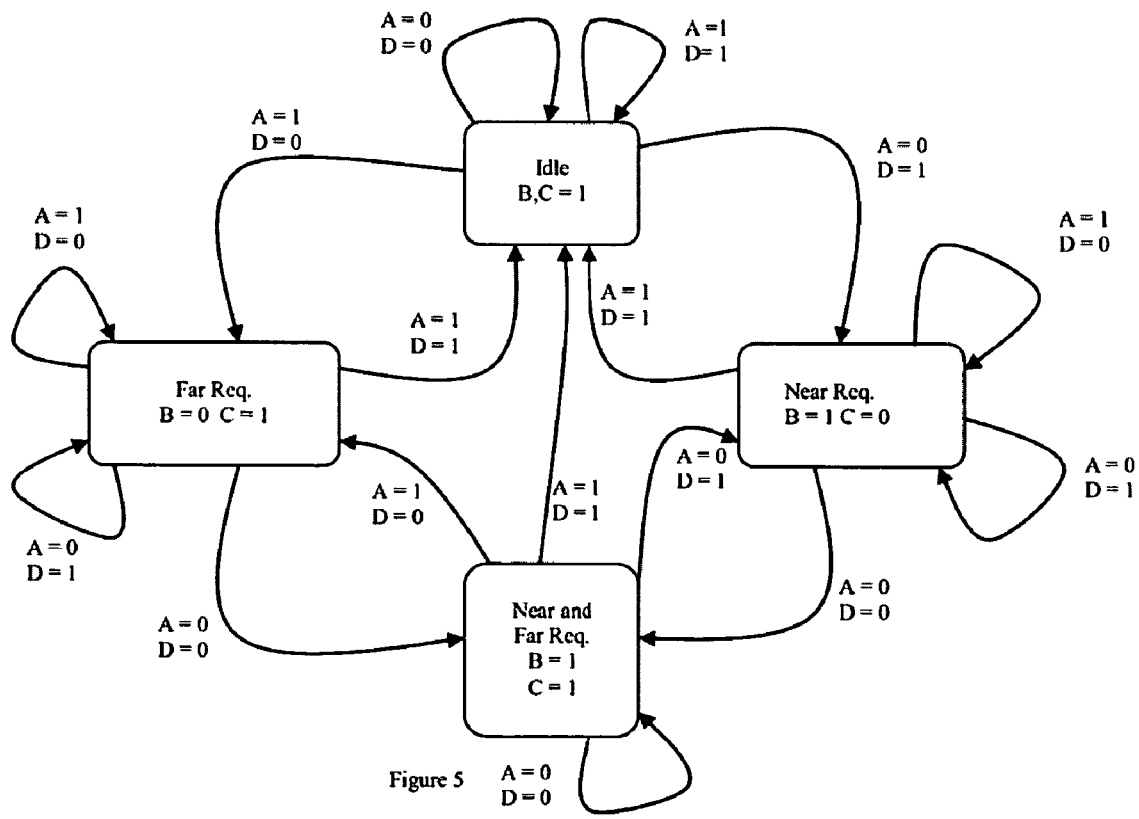
Figure 5

EXCHANGING ASYNCHRONOUS SYSTEM INFORMATION USING OPTICAL TRANSMISSION

FIELD OF THE INVENTION

This invention relates to communication between several intelligent components or computational units that are networked in an information system such as servers and computers. This invention specifically relates to optical transmission of low frequency DC coupled components or information contained in the sideband or auxiliary signals that are used for power management, status, control or reset purposes.

BACKGROUND OF THE INVENTION

A system where multiple computational units are interconnected is frequently used to provide increased processing power. The method by which the computational units share information is of critical importance to the performance of the system. While many connections may be made electronically, it is advantageous to use optical connections for advantages in speed, length of connection, power dissipation, noise immunity, lower electromagnetic emissions, and physical size. There is a class of signals, namely AC-coupled or AC components, which can be easily transposed from an electrical to an optical connection. However, another class of signals, DC coupled signals or DC coupled components do not easily transpose from an electrical connection to an optical one. The primary reason for this is that the high speed (Gb/s-class and greater) optical links which are used for these tapes of connections are typically constructed as AC coupled and not DC coupled. The other reason for this is the uni-directional nature of optical communication. The DC coupled components are commonly referred to as auxiliary signals, or control signals, or power management/reset-initialization signals. Many of these DC coupled signals are unidirectional, i.e. one end of the link sets the logic level and the other end receives it. Unidirectional DC coupled signal can be easily transmitted over AC coupled links, both electrically and optically, using a variety of techniques that are well known to those skilled in the art. However, there is a class of DC coupled signals which are bidirectional, i.e. either end of a link can set the logic level on a common wire and all ends receive it. A wired-and bus with two or more open drain circuits connecting to the same wire and a single shared pull-up resistor or load is one typical example of a bi-directional DC coupled signal. These bidirectional DC coupled signals are not trivial to transmit over an AC coupled optical links due to the unidirectional nature of optical links. There is a third class of DC coupled signal which do not originate from either end of a communication link but, rather, are injected by an independent system or management controller either locally and/or remotely.

There are three main approaches to transmitting the unidirectional auxiliary signals. These three main approaches can be characterized as the three wire approach, the two wire approach and the one wire approach. FIG. I is an example of the three wire approach. Using three wires, the clock (CLK), Data and Data_valid signals are transmitted over the optical link. The CLK is used to sample inputs and generate the outputs and the Data_valid denotes the beginning of valid information. The next approach is the two wire approach. In this approach, there are only the CLK and Data transmission lines of the three wire approach. A DC balanced serializer IC such as the MAX9209 produced by Maxim Inc. is one example of the two wire approach for unidirectional signals.

The final method, not illustrated, is the one wire approach. This method uses a clock and data recovery process to determine the data. A DC balanced serializer IC such as the MAX9247 produced by Maxim Inc. is one example of the one wire approach for unidirectional signals. The one wire approach using a single optical wire for each DC coupled signal that is transmitted is not cost effective nor space and power efficient and is undesirable for high speed optical transmissions. Bidirectional signals must be treated differently. Because of the unidirectional nature of fiber optic links, a minimum of two optical lanes are needed (one in each direction) and some additional logic at each end to combine the state of each unidirectional lane back into the original bidirectional signal.

SUMMARY OF THE INVENTION

Given the current state of the art, what is needed is a system and method that allows a complete set of electrical DC coupled unidirectional and bidirectional signals to be sent over an ac coupled optical bus.

It is an aspect of an embodiment of the present invention to provide a system and method to send and receive a combination of unidirectional and at least one bidirectional signal DC coupled auxiliary signals over two lanes (one in each directional) of an AC coupled parallel optical bus.

It is another aspect of an embodiment of the present invention to provide a system and method for optical transmission of the DC coupled signals that allows for error detection.

BRIEF DESCRIPTION OF THE DRAWINGS

FIG. 3 is detailed illustration of the open drain logic of FIG. 2.

FIG. 4 is an illustration of the truth table representing the logic for the inputs and outputs of FIG. 3.

FIG. 5 is an illustration of the state machine showing the transition of states dependent on the different inputs in FIG. 3.

DETAILED DESCRIPTION OF THE INVENTION

The present invention allows for the sending and receiving of low-frequency DC coupled signals or information between two devices, allowing for bidirectional and unidirectional communication of information. These DC-coupled auxiliary signals are encoded for optical transmission over an ac-coupled link and for which additional logic has been provided to implement multi-node wired-or and/or wired-and operations of at least one bidirectional signal. The optical transmission system may be a source synchronous system composed of the optical encoded auxiliary signals as well as a clock, or simply a serial optical link in which clock recovery is used in the receiving end to extract the clock signal. In this arrangement, each device is capable of driving the auxiliary signals at various times during an exchange of information. In particular, the system maintains an idle state that reduces power when no exchange of information occurs. When either device initiates transmission of information, the appropriate logic, decoder/encoder and clocks are activated to achieve the communication of the signals. In addition, the use of encoding for transmission over the optical link allows for the detection of errors in the transmitted signals. It should also be apparent to those skilled in the art that optical lanes or optical wires is not limited to glass fibers but can be any suitable optical path including polymer waveguides and free space.

Figure 1:
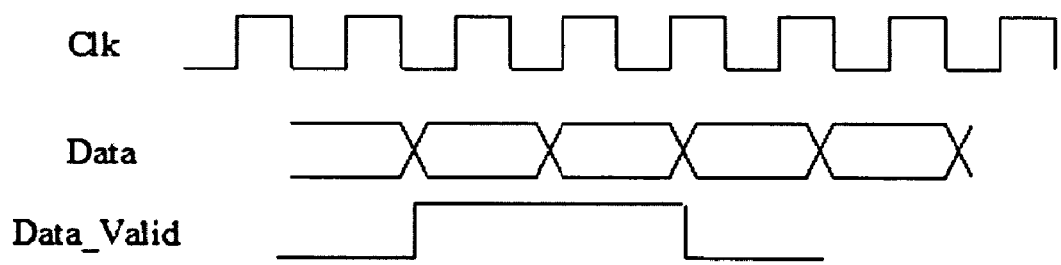
FIG. 1 is an illustration of the three wire approach of the prior art.
Figure 2:
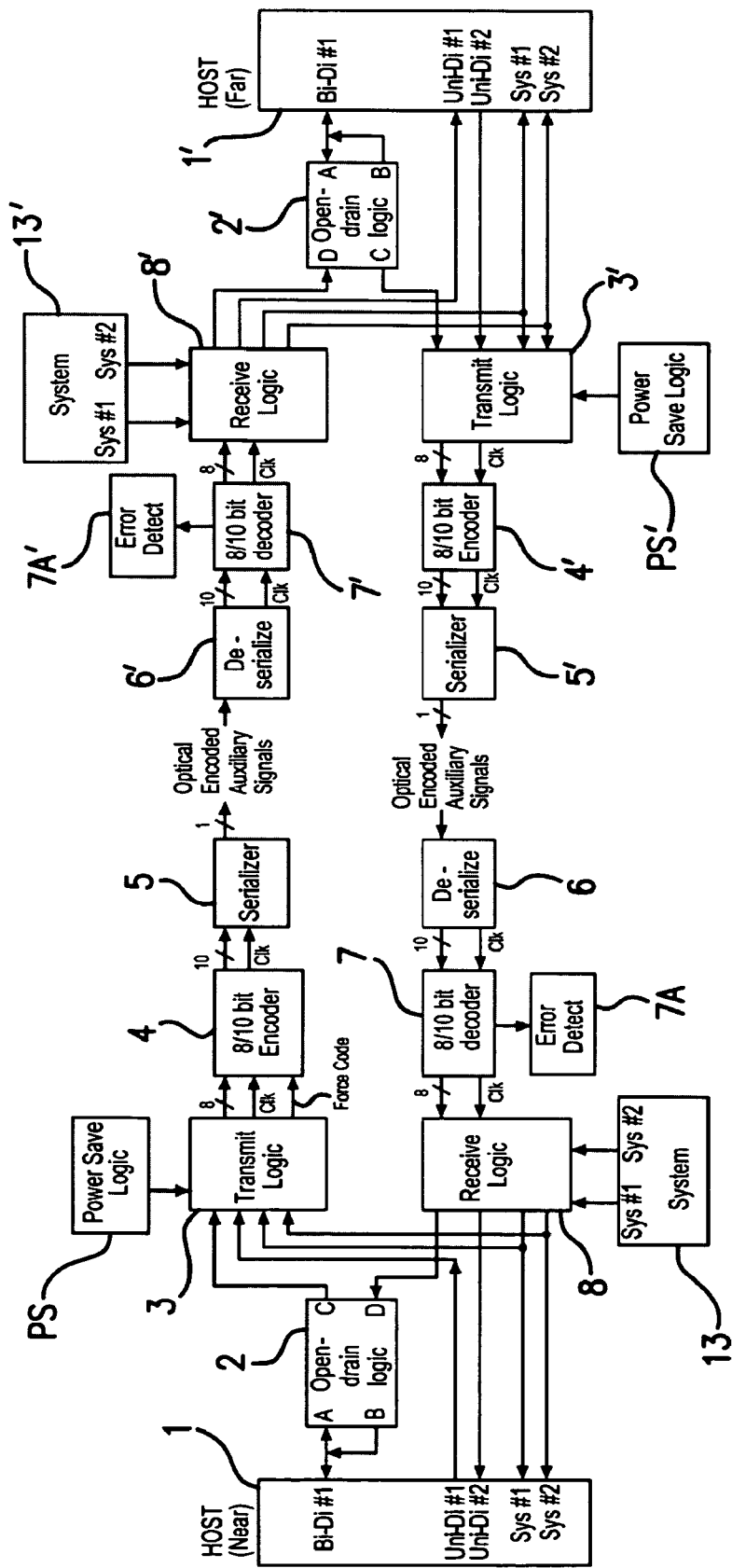
FIG. 2 is an illustration according to an embodiment of the present invention.

FIG. 2 is an exemplary embodiment of the present invention. Host-near, block 1 contains a CPU and the DC coupled components Bi-Di #1, Uni-Di #1, Uni-Di #2, Sys #1 and Sys #2. Bi-Di #1 is a bidirectional wired-and signal that is shared between the near host, 1, and the far host, 1'. Uni-Di #1 is a unidirectional control signal that originates from the near host and terminates at the far host. Uni-Di #2 is a unidirectional signal that originates at the far host and terminates at the near host. Sys #1 and Sys #2 are system signals that originate from a system controller and are sent to each host. As described earlier, Bi-Di #1 requires additional logic, block 2 and 2' to be transmitted optically between the two hosts because of the inherent unidirectional property of optical communication. Blocks 3 and 3' are the standard transmit logic known to those of skill in the art. Blocks 4 and 4' are the 8 bit/10 bit encoder which will now be discussed in detail. Block 8 will be discussed in more detail in reference to FIG. 6.

In communications, 8 bit/10 bit is a line code that maps 8-bit symbols to 10-bit symbols to achieve DC-balance and bounded disparity, and yet provide enough state changes to allow reasonable clock recovery. The difference between the count of "1"s and "0"s in a string of at least 20 bits is no more than 3, and that there are not more than five "1"s or "0"s in a row. This helps to increase the lower frequency limit of the channel necessary to transfer the signal. 8 bit/10 bit encoding has additional advantages. Data bytes are converted to transmission characters to improve the physical signal such that the following benefits are achieved: bit synchronization is more easily achieved, design of receivers and transmitters is simplified, error detection is improved, and control characters (i.e., special characters) can be distinguished from data characters. These special characters (in accordance with IEEE 802.3 specifications) can be used to indicate the start of valid data similar to the conventional three wire system discussed hereinabove. The force code in FIG. 2 at blocks 3,3' and 4,4' is a way to override the encoder internal disparity with a known positive disparity value. An output of the decoder is an error signal. The error signal indicates an error has occurred in decoding one of the special character groups. Blocks 7A and 7A' represent the logic to detect such an error. Blocks PS and PS' represents the logic used to save power when not transmitting information, either by reducing the clock frequency or stopping the clock altogether. Blocks 5,5' and 6,6' represent the serializer and de-serializer as is known to those of skill in the art. Block 6 would typically contain a clock and data recovery function but it will be apparent to those skill in the art that this function could be omitted if the clock is also transmitted separately, i.e. as part of a source synchronous link. Blocks 7 and 7' perform the function of decoding the 8 bit/10 bit scheme as discussed hereinabove. In an exemplary embodiment, the 8 bit/10 bit encoder will be used to transform the combined auxiliary signals such that there are a balanced number of 1's and 0's during transmission. It will be obvious to those skilled in the art that this technique is not limited to the 8 b/10 b code and that there are other dc balanced block codes, scrambling schemes, Manchester encoding and proprietary coding that can achieve the same result. Finally, 13 and 13' contain the system signals Sys #1 and Sys #2.

FIG. 3 is an exploded view of the open-drain logic of FIG. 2. The word "drain" in the term open-drain refers to the drain terminal of a MOSFET transistor. An open drain terminal has a low impedance to ground in the low voltage (logic 0) state, but has high impedance in the logic 1 state. This high impedance prohibits current flow, but as a result, such a device requires an external pull-up resistor (not shown) which is also connected to the positive voltage rail. When a device is in the high-impedance state, the pull-up resistor keeps the line at logic 1. The line stays there until the device goes into the logic 0 state, and begins to sink current. This current flow creates a voltage drop across the pull-up resistor, and the line drops to the logic 0 voltage. One version of the open-drain circuitry is referred to as wired-and which is installed in the present invention. The truth table in FIG. 4 explains the logic for the various inputs and outputs for the circuitry in FIG. 3. It will be recognized by those skilled in the art that this applies to open-collector technology as well. It is also noted that the open drain logic function may be used to implement either a wired-and or the complementary wired-or logic functions.

FIG. 5 illustrates the various states of the finite state machine according to the present invention. The present invention has the capacity to transmit signal components during transition states. For example, the present invention may transmit signal components during the transition from the near request state to the idle state by the open-drain circuitry discussed hereinabove. Transmission may occur during the transitions to and from other states as those skilled in the art will recognize.

Figure 6:
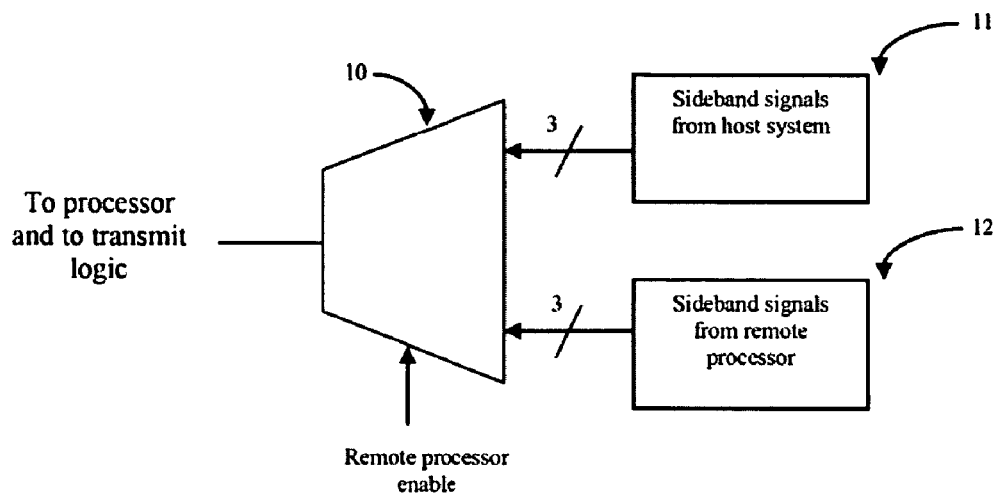
FIG. 6 is an illustration of the receive logic of the present invention.

FIG. 6 is a more detailed view of the receiver logic 8 and 8' in FIG. 2. The receiver logic block includes a multiplexer/remote processor enable 10 to select between using the signals sourced from the system side 11 or signals sent from a remote processor 12. The legend 13 lists the auxiliary signals Bi-Di #1, Uni-Di #1, Uni-Di #2, Sys #1 and Sys #2 which were discussed hereinabove that are presented to the multiplexer/remote processor enable 10.

Figure 7:
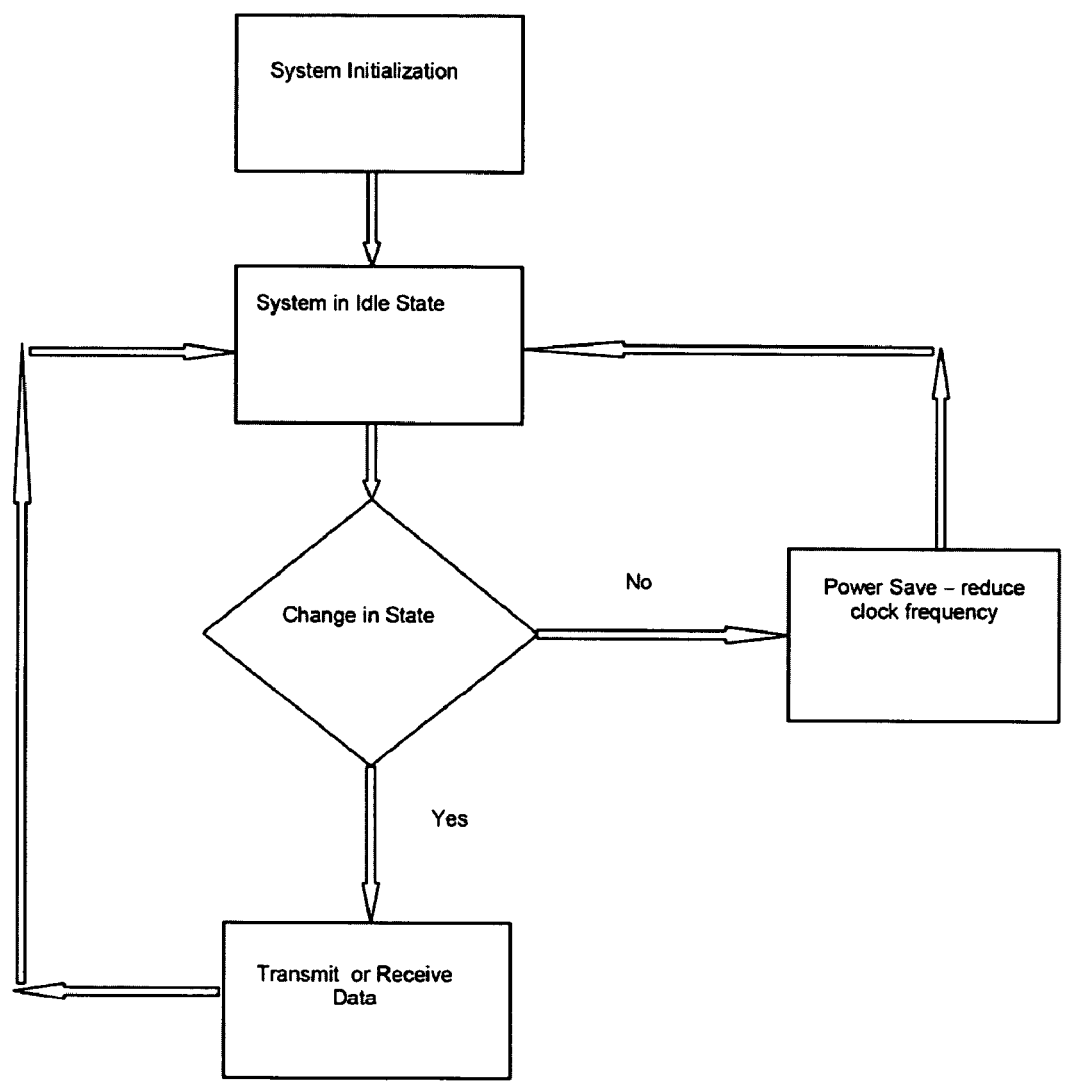
FIG. 7 is an illustration of the transmission of the DC auxiliary information of the present invention.

FIG. 7 is a flowchart illustrating a method for the exchange of information in accordance with the exemplary embodiment of the invention. As shown in FIG. 7, the method begins with a system initialization state. It then proceeds to a System Idle State. Control then proceeds to a decision state, where it is determined whether there is a change in the state of the system, i.e. one of the auxiliary signals is transitioning. If there is not a change, then the system can go to a power save state, by either reducing the clock frequency or completely stopping the clock. If there is a change in the state of the system then the system will transmit or receive data, depending on the type of change in the state of the system, and which device in the system initiated the change.

The invention has been described in detail with particular reference to certain embodiments thereof, but it will be understood that variations and modifications can be effected within the spirit and scope of the invention.

The invention claimed is:

1. A method for transmitting DC coupled signals and system signals in a computational system comprising:

providing at least one pair of hosts which communicate with each other bi-directionally wherein each host in the at least one pair of hosts has at least one bidirectional open drain wired-and signal associated with each host;

converting the at least one bidirectional open drain wired-and signal from a first host in the pair into a unidirectional DC coupled transmit signal and a unidirectional DC coupled receive signal;

combining and preparing the unidirectional DC coupled transmit signal with other unidirectional DC coupled signals and system signals to be transmitted from the first host in the pair for encoding;

encoding the respective first set of multiple unidirectional DC coupled transmit signals into respective AC coupled signals;

providing an optical link between at least one pair of hosts having at least one optical lane in each direction;

transmitting and receiving the respective AC coupled signals over a respective one of the at least one optical lane;

decoding the respective AC coupled signals into a second set of respective multiple unidirectional DC coupled receive signals;

wherein one unidirectional DC coupled receive signal in the second set of respective multiple unidirectional DC coupled receive signals is received on a respective one of an open-drain wired-and unit associated with a second host in the at least one pair of hosts providing respective open-drain output signals; and recombining a second unidirectional DC coupled receive signal in the second set of respective multiple unidirectional DC coupled receive signals, and one of a respective open-drain output signal to provide for new respective bidirectional signals to implement a respective one of an open-drain wired-and function associated with one respective host in the at least one pair of hosts.

\* \* \* \* \*